(12) United States Patent
Lee

(10) Patent No.: US 6,485,288 B2
(45) Date of Patent: Nov. 26, 2002

(54) CLOSE-STYLE LEAK PREVENTING DEVICE FOR A FLUID SHOOTING NOZZLE OF AN INJECTION MOLDING MACHINE

(76) Inventor: Po-Chien Lee, 51, Tay-yi Rd., Jente Hsiang 717, Tainan (TW)

( * ) Notice: Subject to any disclaimer, the term of this patent is extended or adjusted under 35 U.S.C. 154(b) by 4 days.

(21) Appl. No.: 09/785,698

(22) Filed: Feb. 15, 2001

(65) Prior Publication Data

US 2002/0110617 A1 Aug. 15, 2002

(51) Int. Cl.[7] .............................................. B29B 45/23
(52) U.S. Cl. ...................................... 425/564; 425/567
(58) Field of Search ................................ 425/562, 563, 425/564, 565, 566, 567

(56) References Cited

U.S. PATENT DOCUMENTS

| 4,013,393 A | * | 3/1977 | Gellert | 425/566 |
| 4,026,518 A | * | 5/1977 | Gellert | 425/566 |
| 4,053,271 A | * | 10/1977 | Gellert | 425/562 |
| 4,082,226 A | * | 4/1978 | Appleman et al. | 425/564 |
| 4,125,352 A | * | 11/1978 | Gellert | 425/566 |

* cited by examiner

Primary Examiner—Tim Heitbrink
(74) Attorney, Agent, or Firm—Pro-Techtor International Services

(57) ABSTRACT

A leak preventing device for fluid shooting nozzle of an injection molding machine includes a material stop valve pivotally screwed with a front side of a vertical flow passageway of a hot-material passageway plate, a shaft position base provided at a rear side of the vertical flow passageway, a shaft inserting through the stop valve, the vertical flow passageway and the shaft position base, and a material stop end at front end of the shaft supported by a support plate in the material stop valve. The rear end of the shaft protrudes out of the shaft position base and connected to a piston fixed with a mold fix plate for mutual movement to lot the stop end of the shaft rod fitting in a shooting nozzle in the stop valve to prevent raw material inside from leaking out. Besides, after a screw conveying tube shoots out raw material, the remaining pressure in a flow passageway will push the leak-preventing portion to prevent leaking.

1 Claim, 7 Drawing Sheets

CLOSE-STYLE LEAK PREVENTING DEVICE FOR A FLUID SHOOTING NOZZLE OF AN INJECTION MOLDING MACHINE

BACKGROUND OF THE INVENTION

This invention relates to a close-style leak preventing device for a fluid shooting nozzle of an injection molding machine, particularly to one possible to surely prevent raw material inside from leaking out along a hot-material passageway plate and the shooting nozzle of a screw conveying tube of a injection molding machine.

A first known conventional injection molding machine includes a shaft of a stop valve of a hot-material passageway plate, and it is almost of a straight rod shape, fitted around its rear portion with a an annular hollow gasket, as shown in FIG. 9, and placed in a shaft position base. When the stop valve of the hot-material passageway plate and the shaft are closed, the remaining pressure still left in the passageway of the hot-material passageway plate pushes raw material inside fill the hollow gasket so that the gasket is inflated to prevent raw material inside from leaking out along the gap between shaft and the shaft position base. But a long-term use of the hollow gasket may render it weak or exhausted and even damaged by repeated friction with a center hole of the shaft position base, resulting in serious leaking. Besides, the hollow gasket requires high technique in manufacturing, thus elevating its cost.

To eliminate foresaid defects, DWE Company in U.S.A. has worked out a valve system, as shown in FIG. 10. In this valve system, the contact dimensions between a shaft rod (A) and a shaft hole (A1) is lengthened to prolong time for use, but it is still shaped straight, liable to form a gap by long-term friction between them and impossible to avoid liability of leaking, as indicated by the arrow in FIG. 10, and with the shaft possible to be deadlocked.

Further, in a second known conventional injection molding machine, the shaft in a material stop valve of a screw conveying tube, as shown in FIG. 11, has a conical tip like a crayon shape, so after it is fitted in a shooting nozzle, there leaves a gap between the conical end of the stop valve and the shooting nozzle, letting raw material with remaining pressure in the passageway tube of the stop valve leaking out from the gap.

There is also a case of Japanese Patent No. 7-223241, as shown in FIG. 12, and it is also designed to have a straight shaft (B) so that the prevention of leaking caused by high pressure pushing depends only on a common difference between the shaft (B) and the shaft hole (B1). If the common difference is diminished, the shaft (B) may be deadlocked by excessive interference and after used for long, a serious leaking problem will inevitably occur due to a loose condition caused by mutual friction between the shaft (B) and the shaft hole (B1), and if worse, a fire may occur by hot leaking raw material.

SUMMARY OF THE INVENTION

The objective of this invention is to offer a leak preventing device for a fluid shooting nozzle of an injection molding machine, possible to make the material stop valve of a screw conveying tube completely closed when shooting out raw material so as to prevent raw material inside from leaking out along the shaft position base of the hot-material passageway plate by closing the material stop valve and the shaft position base.

BRIEF DESCRIPTION OF DRAWINGS

This invention will be better understood by referring to the accompanying drawings, wherein.

DETAILED DESCRIPTION OF THE PREFERRED EMBODIMENT

Figures 6, 7:
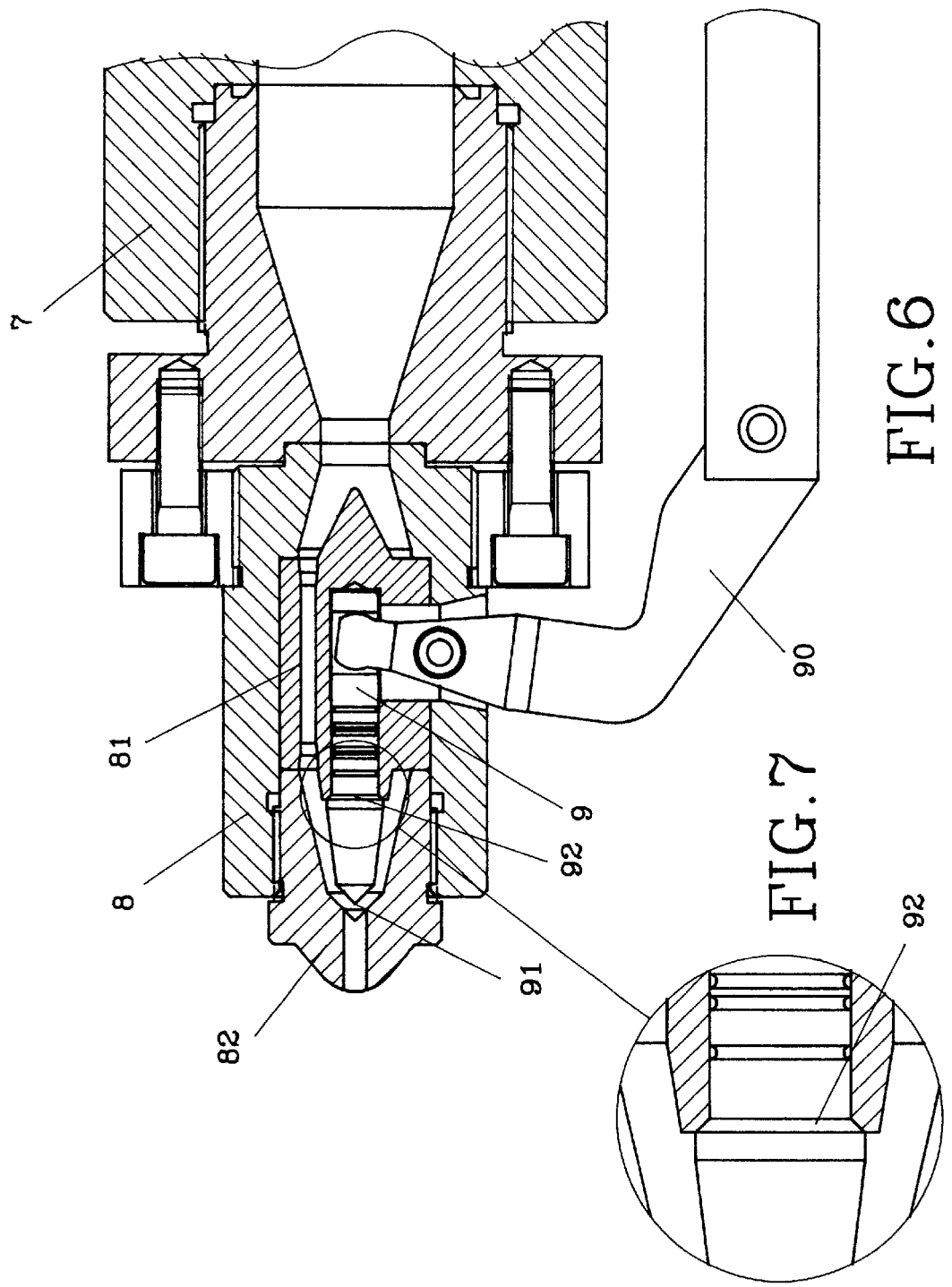
FIG. 6 is a side cross-sectional view of a shaft in the material stop valve in the present invention.
FIG. 7 is a magnified side view of the shaft in the material stop valve in the present invention.
Figure 10:
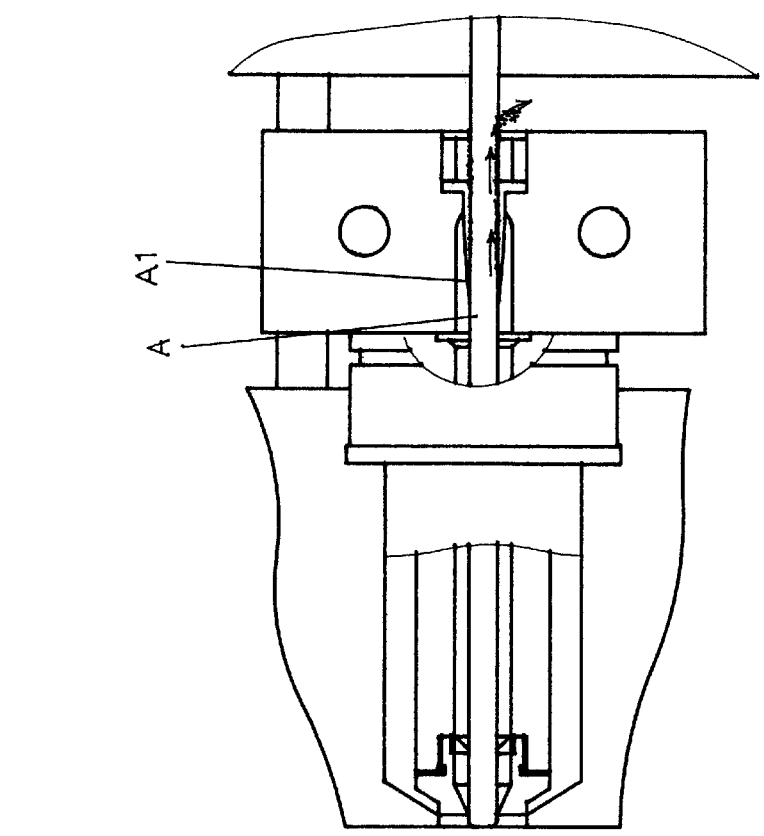
FIG. 10 is a side cross-sectional view of a valve system disclosed by DME COMPANY in America.
Figure 8:
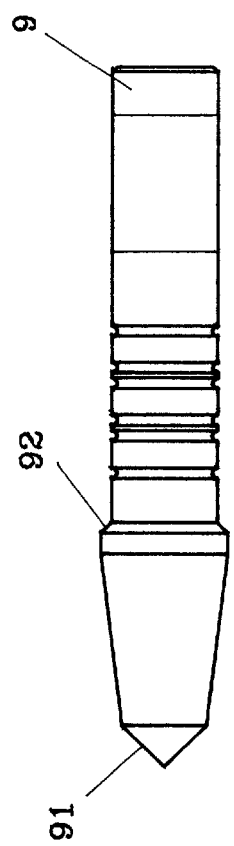
FIG. 8 is a side view of the shaft in the material stop valve in the present invention.
Figure 9:
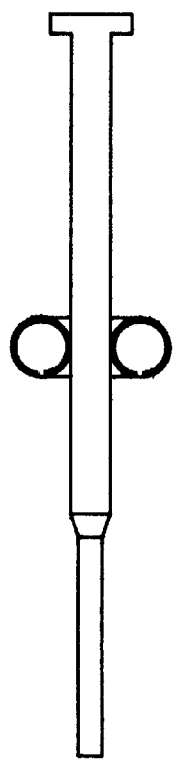
FIG. 9 is a side view of a fist known conventional shaft and an annular hollow gasket.
Figure 11:
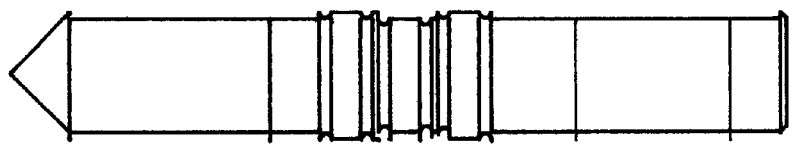
FIG. 11 is a side view of a second known conventional shaft.
Figure 12:
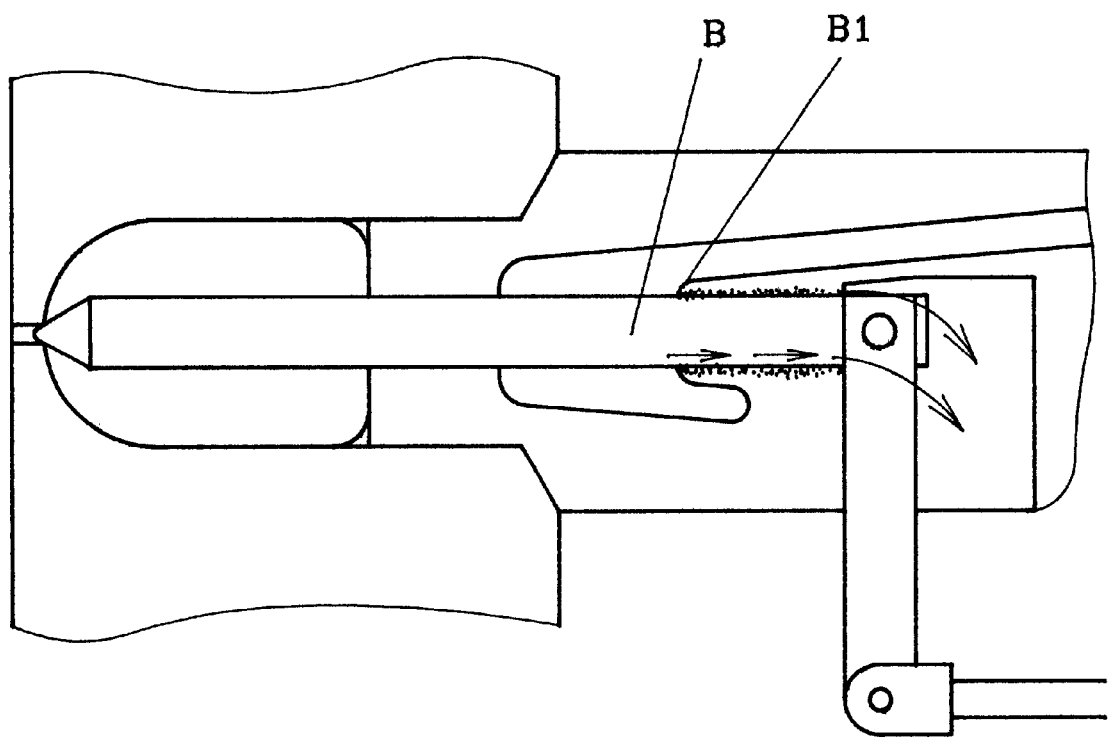
FIG. 12 is a side cross-sectional view a shaft core and a shaft hole in: a case disclosed in Japanese Patent No. 7-223241.

A preferred embodiment of a leak preventing device for a fluid shooting nozzle of an injection molding machine in this invention, as shown in FIGS. 1 to 5, includes a material stop valve 3 screwed with a front side of a vertical flow passageway 20 in a hot-material passageway plate 2 fixed behind a mold 1 and a shaft position base 4 provided to face a rear side of the vertical flow passageway 20, and a position portion 41 with a comparatively larger diameter provided at a front side of the horizontal flow passageway 40 of the shaft position base 4. Then, a shaft 5 inserts through the stop valve 3, the vertical flow passageway 20 and the shaft position base 4, having a stop end 50 supported by a support plate 31 in the stop valve 3. Besides, the rear end of the shaft rod 5 protrudes out of the shaft position base 4 and is connected to a piston 61 fixed in a mold plate 6 so as to let the piston 61 actuated to push the stop end 50 fitting in the nozzle 32 of the material stop valve 3. In addition, referring to FIG. 6 to 8, a flow tube 81 and a shaft 9 are located inside a stop valve 8 of a screw conveying tube 7 and screwed with a shooting nozzle 82, and the end of the shaft 9 connected with an air cylinder lever set 90 to permit the cylinder lever set 90 activate to push the stop end 91 of the shaft 9 fitting in the nozzle 82 to stop and prevent raw material from leaking out.

Figure 1:
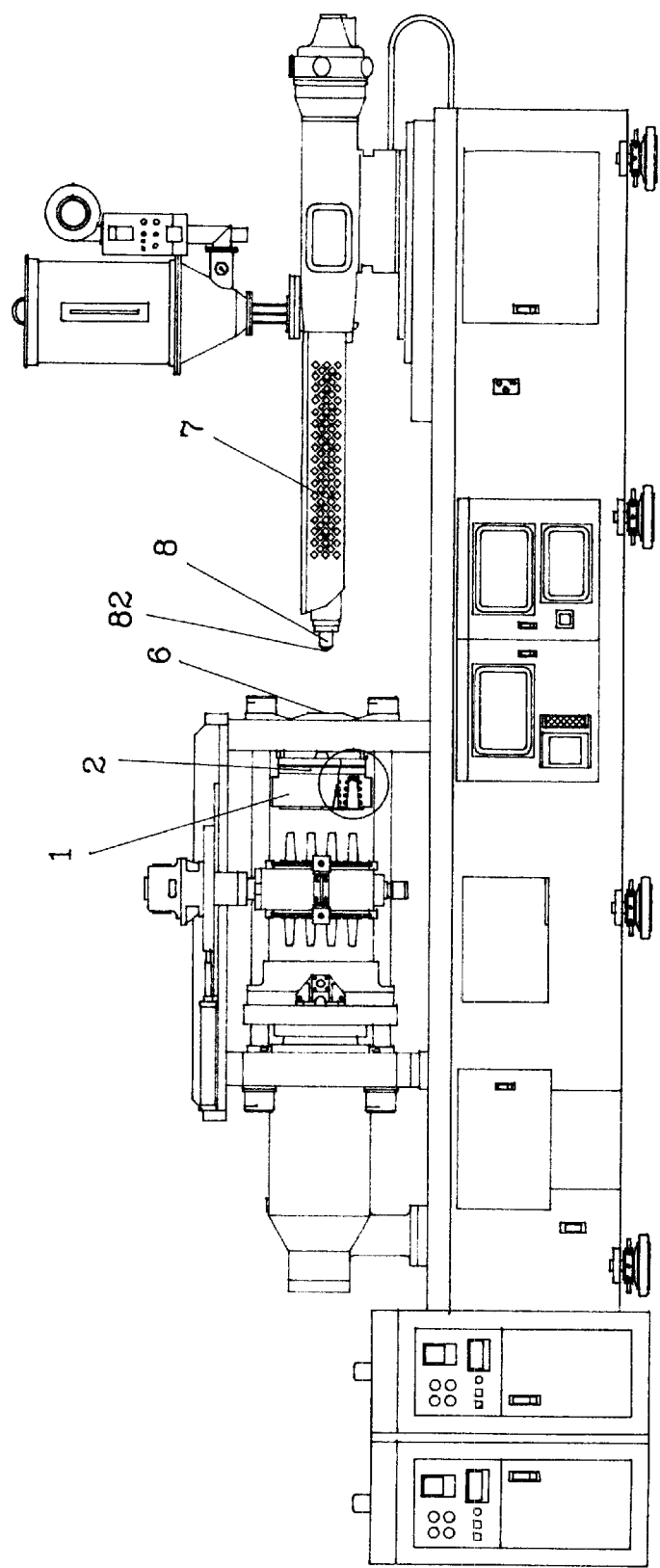
FIG. 1 is a front view of a leak-preventing device for a fluid-shooting nozzle of an injection molding machine in the present invention.
Figure 2:
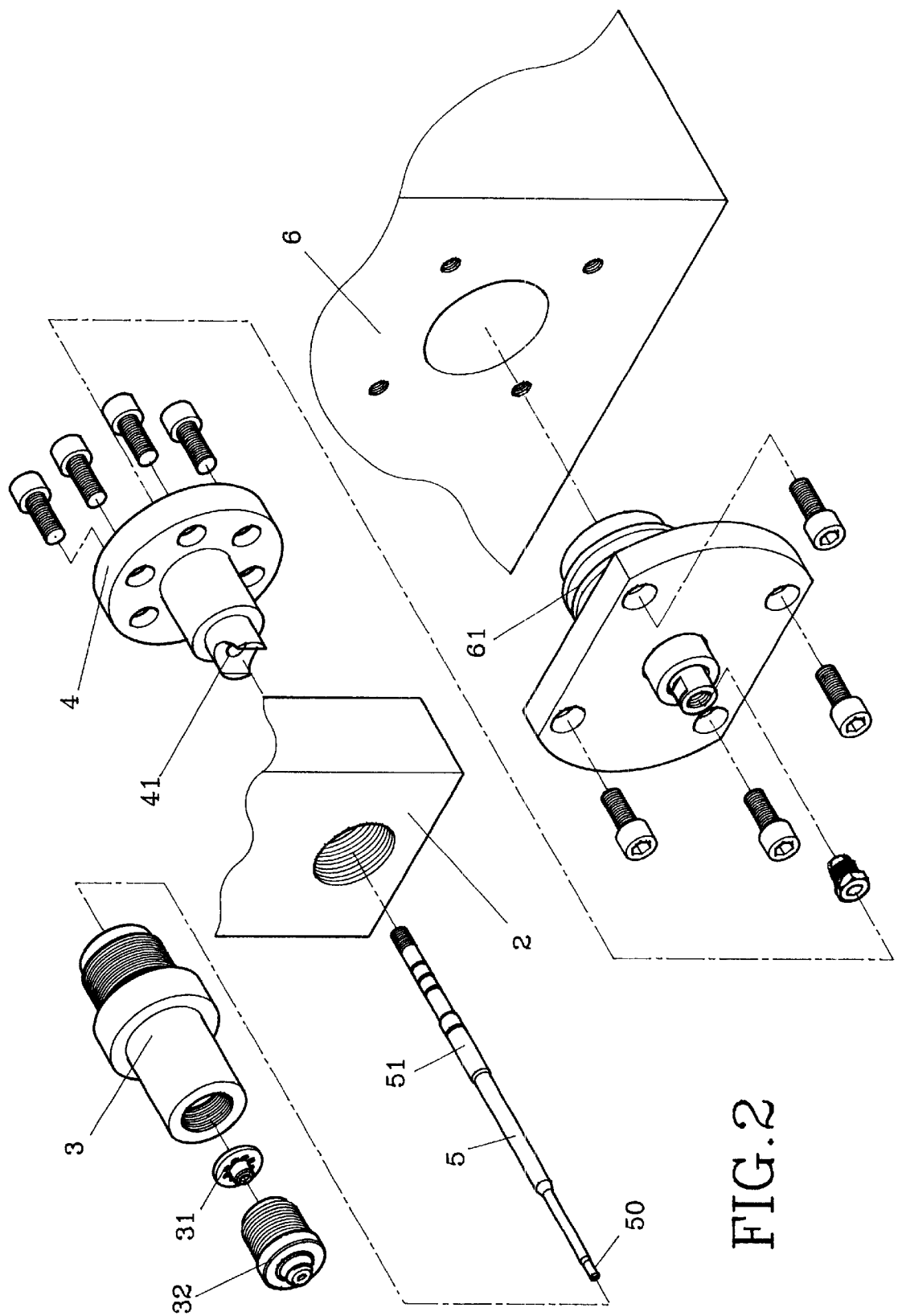
FIG. 2 is an exploded perspective view of a hot-material passageway plate and a mold fixing plate in the present invention.
Figure 3:
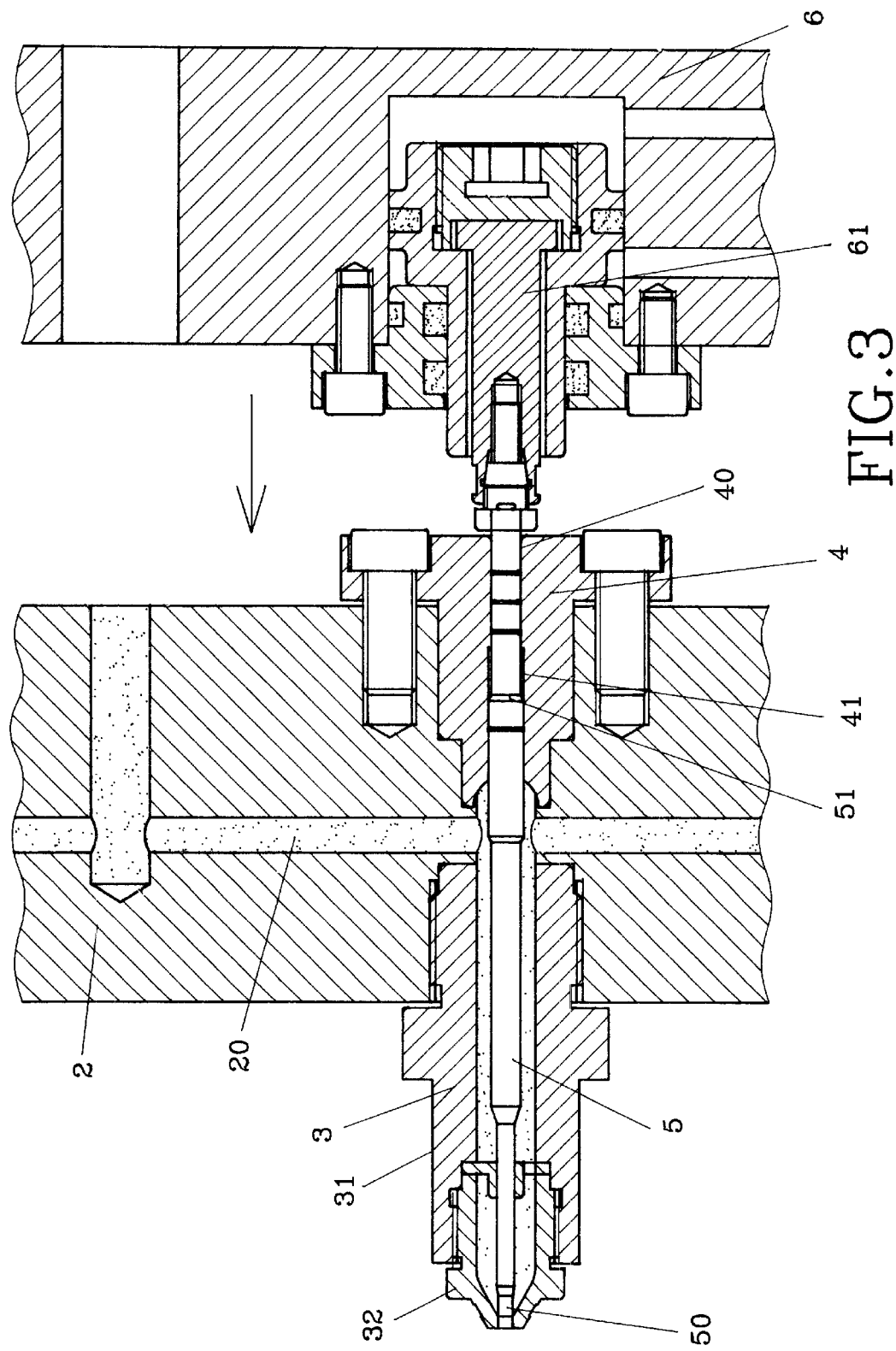
FIG. 3 is a side cross-sectional view of a shaft located in a hot-material valve and a shaft position base in the present invention.
Figures 4, 5:
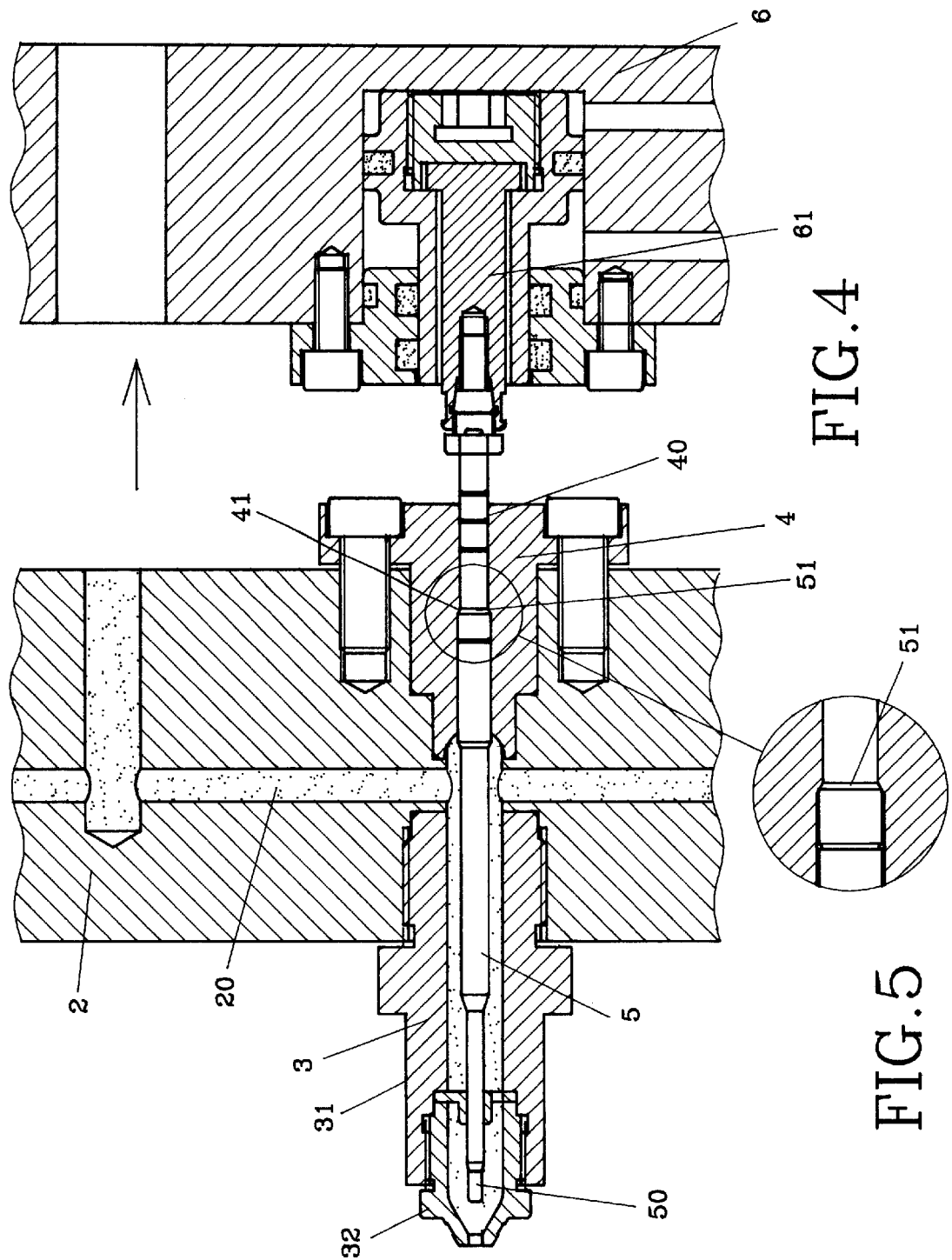
FIG. 4 is a side cross-sectional view of the shaft closed in the material stop valve and the shaft position base in the present invention.
FIG. 5 is magnified side view of the shaft closed in the material stop valve and in the shaft position base in the present invention.

The feature of the invention is the shaft 5 having the intermediate portion provided with the leak preventing portion 51 with a comparatively larger diameter, as shown in FIGS. 3 to 5, to permit the contact surface of the leak preventing portion 51 and the position portion 41 of the shaft position base 4 fit closely with each other to prevent raw material from leaking along the shaft position base when the stop end 50 of the shaft 5 and the shooting nozzle 32 are separated for shooting out raw material. Furthermore, the leak preventing portion 92 is formed in an intermediate portion of the shaft 9, having a comparatively larger diameter so that after the screw conveying tube 7 shoots out raw material, the stop end 91 of the shaft 9 fits in the nozzle 82, and the inner surface of the leak preventing portion 92 will be pushed by the force of flowing material with high pressure and high temperature in the flow tube 81 and consequently stop the raw material inside from leaking out.

While the preferred embodiment of the invention has been described above, it will be recognized and understood that various modifications may made therein and the appended claims are intended to cover all such modifications that may fall within the spirit and scope of the invention.

I claim:

1. A leak-preventing device for a nozzle of an injection molding machine comprising:

a material stop valve affixed to a front side of a hot-material passageway plate situated behind a mold, a central throughway of said stop valve being in communication with a material flow passageway in said hot-material passageway plate, a shaft position base affixed to a rear side of said material flow passageway, a central throughway of said position base having a larger diameter at a front end thereof than at a rear end thereof, a first shaft passing through said stop valve, said material flow passageway, and said shaft position base, a material stop end at a front end of said first shaft being supported by a support plate in said material stop valve, and a rear end of said first shaft protruding from said shaft position base and is connected to a piston secured in a mold fix plate, such that when said piston is actuated, said piston pushes said stop end of said first shaft into a nozzle of said stop valve; and a flow tube and a second shaft are provided inside a stop valve of a screw conveying tube equipped with a nozzle, an end of said second shaft being connected to an air cylinder lever set, such that when said air cylinder set is actuated, a material stop end of said second shaft is positioned in said nozzle of said screw conveying tube to prevent raw material inside said screw conveying tube from leaking out of said screw conveying tube; wherein a leak preventing portion in an intermediate portion of said first shaft is actuated when said stop end of said second shaft is separated from said nozzle of said screw conveying tube to release a flow of raw material, and when said leak preventing portion is not actuated, said leak preventing portion is received in said position portion of said shaft position base to prevent raw material from leaking out along said shaft position base.

* * * * *